UNITED STATES PATENT OFFICE.

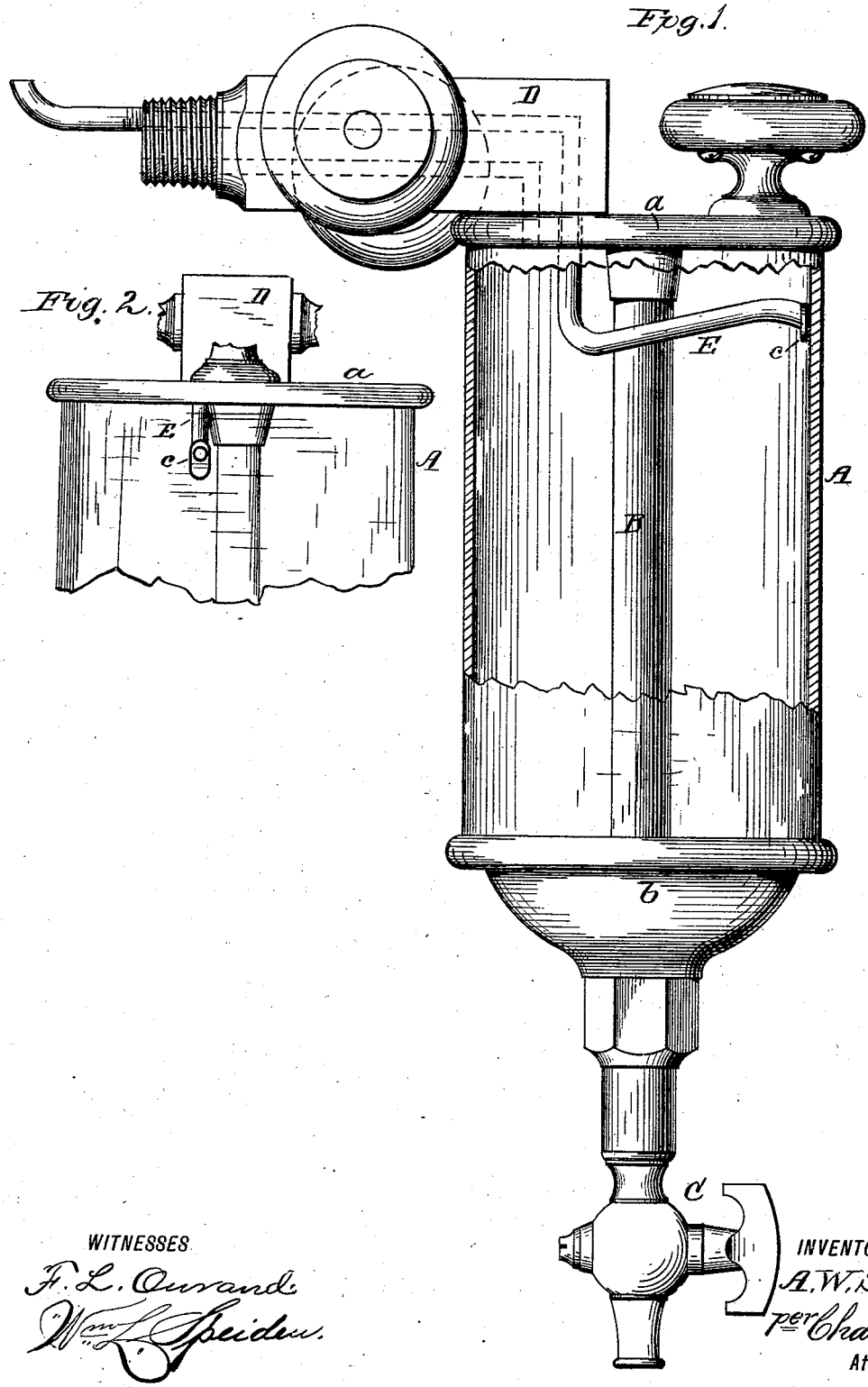

ALLEN W. SWIFT, OF ELMIRA, NEW YORK.

LUBRICATOR.

SPECIFICATION forming part of Letters Patent No. 255,353, dated March 21, 1882.

Application filed January 20, 1882. (Model.)

To all whom it may concern:

Be it known that I, ALLEN W. SWIFT, a citizen of the United States, residing at Elmira, in the county of Chemung and State of New York, have invented certain new and useful Improvements in Lubricators; and I do hereby declare that the following is a full, clear, and exact description of the same, reference being had to the annexed drawings, making a part of this specification, and to the letters and figures of reference marked thereon.

Figure 1 of the drawings is a side elevation of a lubricator embodying my invention, with a portion of the glass cylinder broken away; and Fig. 2 is a detail view, showing the face or end of the drip tube or pipe.

The present invention has reference to lubricators for steam-engines in which the water formed by the condensation of steam is permitted or caused to descend into the oil chamber or cylinder, whereby the oil therein is displaced and caused to ascend from the chamber or cylinder through a suitable outlet.

The means usually employed for obtaining the object above specified was the use of a short pipe or tube communicating with the supply of water of condensation, and extending down into the oil chamber or cylinder, to conduct the drops of water into and through the oil, and thereby displace an equal quantity of the oil and cause it to ascend into the steam-supply pipe.

The essential and important feature in this class of lubricators is to be enabled at all times by observation to ascertain whether they are properly and regularly working, or the drops of water from the condensation of the steam regularly pass into the oil.

Previous to my invention these pipes or tubes for conveying the drops of water into the oil were usually so located with relation to the interior of the oil-cylinder that the drops of water would descend directly into the oil, and consequently, without a very transparent oil were used, it would be almost impossible to see the drops of water as they passed in and through the oil. The above difficulty, however, has to a certain extent been overcome by extending the end of the drip tube or pipe so near the inner surface of the glass cylinder that the water, as it escaped from the pipe or tube, would be delivered against the surface of the cylinder, to enable the drops of water to be more readily distinguished. It should be understood that these drops of water coming against the surface of the glass cylinder were the sole means of ascertaining whether the apparatus was working properly or not, and could be distinguished only at a short distance.

It is the purpose of my invention to provide means for more positively and clearly at a considerable distance to ascertain whether the apparatus is properly working, without depending upon the drops of water coming against the glass cylinder as the sole means of attaining this end, which object I accomplish by the means hereinafter described.

In the accompanying drawings I have shown one of many forms of lubricators to which my invention is applicable, A representing a glass cylinder for holding the oil, said cylinder being confined between a metal top and bottom, a b, held together by the usual metal tube, B, through which the water is drained from the cylinder by the waste-cock C. The head or top a has an extension-piece, D, provided with a screw-threaded sleeve for connecting thereto the steam-pipe of the engine. The extension-piece D has the usual passage for the oil into the steam-supply pipe of the engine and a second passage for the delivery of the water of condensation into the pipe or tube E, said passage being controlled by suitable valves.

The lubricator, as above described, is of the ordinary construction, and I have simply shown it to illustrate the application and operation of my invention, and therefore further description of it is deemed unnecessary.

Heretofore the pipe or tube E, although brought to a sufficiently close proximity to the inner surface of the glass cylinder to conduct the drops of water against the surface of the same, no other means were provided to enable the operation of the lubricator to be ascertained other than the drops of water passing down against the surface of the glass cylinder, which could not be seen at any very great distance.

The tube or pipe E, I not only extend its end in close proximity to the interior surface of the cylinder A, but highly polish the end of the tube or pipe, or, if desired, connect to it a flat plate, c, having a polished surface, to form an indicator. The water, immediately upon issuing from the tube or pipe E, will come in contact with the surface of the glass cylinder and displace the oil between it and the end of the tube or pipe, thereby exposing to view the polished surface of the end of the tube or pipe or the plate c, as the case may be, which can be readily seen or distinguished at a considerable distance. This exposure of the polished or bright metal surface of the tube or pipe is repeated as each drop of water passes therefrom, thereby enabling, without any difficulty, the attendant ascertaining at all times, at a considerable distance away, whether the lubricator is properly operating, no matter how dark or opaque the oil may be.

As previously stated, my invention is applicable to most all lubricators operating upon this principle, and it is not essential that the cylinder should be wholly of glass, so long as that portion directly opposite the end of the tube or pipe E is transparent, to expose to view the end thereof, as hereinbefore described, and therefore, if desired, the cylinder A may be constructed of metal, with a window or "sight" on a line opposite the tube or pipe.

Having now fully described my invention, what I claim as new, and desire to secure by Letters Patent, is—

1. A drip-tube of a lubricator having its end highly polished to present a bright surface, and extended in close proximity to the transparent portion of the oil-cylinder, substantially as and for the purpose set forth.

2. A drip-tube of a lubricator having a plate with a polished surface at its end, and extending in close proximity to the transparent portion of the oil-cylinder, substantially as and for the purpose specified.

In testimony that I claim the above I have hereunto subscribed my name in the presence of two witnesses.

ALLEN W. SWIFT.

Witnesses:
E. H. BRADFORD,
H. J. ENNIS.